US009319325B2

(12) United States Patent
Mohandoss et al.

(10) Patent No.: US 9,319,325 B2
(45) Date of Patent: Apr. 19, 2016

(54) ADAPTIVE METHOD AND SYSTEM OF REGULATION OF YELLOW TRAFFIC IN A NETWORK

(75) Inventors: Govindarajan Mohandoss, Bangalore (IN); Santosh Narayanan, Bangalore (IN); Vijaya Bhaskar Kommineni, Gantyada (IN); Rayesh Kashinath Raikar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 12/861,852

(22) Filed: Aug. 24, 2010

(65) Prior Publication Data
US 2012/0051218 A1 Mar. 1, 2012

(51) Int. Cl.
*H04L 12/851* (2013.01)
*H04L 12/813* (2013.01)
*H04L 12/819* (2013.01)

(52) U.S. Cl.
CPC ............ *H04L 47/2425* (2013.01); *H04L 47/20* (2013.01); *H04L 47/215* (2013.01)

(58) Field of Classification Search
CPC .... H04L 47/20; H04L 47/215; H04L 47/2425
USPC ............................................... 370/230–235.1
See application file for complete search history.

(56) References Cited

U.S. PATENT DOCUMENTS

| 7,664,028 | B1* | 2/2010 | Gingras | ............ H04L 41/5022 370/229 |
| 2003/0152084 | A1* | 8/2003 | Lee | .................. G06F 9/3885 370/395.21 |
| 2005/0141427 | A1* | 6/2005 | Bartky | ........................ 370/235 |
| 2010/0177635 | A1* | 7/2010 | Figueira | ...................... 370/230 |

OTHER PUBLICATIONS

"ItswTCM: a new aggregate marker to improve fairness in DiffServ" by Hongjun Sua, Mohammed Atiquzzamanb; Received Mar. 19, 2002; revised Aug. 23, 2002; accepted Oct. 10, 2002; pp. 10. ; (Last Visited Oct. 26, 2010).

* cited by examiner

*Primary Examiner* — Huy D Vu
*Assistant Examiner* — Stephen J Clawson
(74) *Attorney, Agent, or Firm* — Barnes & Thornburg LLP

(57) ABSTRACT

A method, an apparatus and/or a system to regulate yellow traffic in a network is provided. In one embodiment, the method includes quantifying, an extent of violation of a transmission rate of a data traffic relative to a committed bandwidth profile in a network. The data traffic is generated through a client device coupled to the network. The method also includes regulating, a volume of the data traffic associated with a particular level of compliance relative to the committed bandwidth profile, at an edge node of the network, based on the quantification. The committed bandwidth profile specifies an average rate of committed and excess data traffic generated by the client device. The particular level of compliance is characterized by the transmission rate exceeding a committed information rate and lying within a peak information rate. The peak information rate is maximum allowable rate of admission of frames into the network.

20 Claims, 6 Drawing Sheets

ADAPTIVE METHOD AND SYSTEM OF REGULATION OF YELLOW TRAFFIC IN A NETWORK

FIELD OF TECHNOLOGY

Embodiments of the disclosure relate generally to the field of data traffic policing in a network and, more particularly, to adaptive method and system of regulation of yellow traffic in a network with a data traffic policing implemented therein.

BACKGROUND

Two rate three color marking (TRTCM) technique for regulation of network traffic includes classifying data traffic into green, yellow and red based on one or more traffic parameters including, for example peak information rate (PIR) and committed information rate (CIR). A network service based on the TRTCM may discard all the red frames, forward the yellow frames with relatively high drop probability and forward the green frames with a low drop probability. A large metro Ethernet based network with numerous different flows pertaining to different customers may include numerous individual flow based policers.

Each of the policers may perform color classification of the traffic based on the instantaneous rates, causing a significant volume of yellow traffic to be injected into the core of the network. In the core of the network, if a scheduling delay occurs the data frames may be piled up in a queue and may exceed the CIR, and thereby may be marked as yellow by the policers in a next immediate node. The resultant yellow frames may include both green frames as well as yellow frames from the edge node. Both the yellow and green frames from the edge node may compete for a common queue of resources in subsequent nodes of the core of the network causing inconvenience and network traffic congestion in the core network.

SUMMARY

Disclosed are a method, an apparatus and/or a system to regulate yellow traffic in a network.

In one aspect, the method includes quantifying, through a processor, an extent of violation of a transmission rate of data traffic relative to a committed bandwidth profile in a network. The data traffic is generated through a client device coupled to the network. The committed bandwidth profile is characterized on the basis of a committed information rate, a peak information rate, a committed burst size, and a peak burst size. The committed information rate is an average rate of admission of a number of frames associated with the data traffic into the network. The peak information rate represents a maximum allowable rate of admission of the frames into the network. The committed burst size represents a maximum size of frames, transmittable through the network.

The peak burst size represents a maximum size of an uncommitted frame of the data traffic that the network attempts to carry. The committed bandwidth profile specifies an average rate of committed and excess data traffic generated by the client device. During quantifying, a predetermined type of data traffic injected into the network through the client device may be measured during a configurable period of time. The predetermined type of data traffic is associated with a predetermined level of compliance relative to the committed bandwidth profile of the network. Also, an extent of violation of the transmission rate of the measured predetermined type of data traffic from the committed bandwidth profile may be determined based on a violation metric.

The method also includes regulating, through the processor, a volume of the data traffic associated with a particular level of compliance relative to the committed bandwidth profile of the network, routed at an edge node of the network, based on the quantification. The particular level of compliance is characterized by the transmission rate exceeding a committed information rate and lying within a peak information rate. The committed information rate is an average rate of admission of a number of frames associated with the data traffic into the network. The peak information rate represents a maximum allowable rate of admission of the frames into the network. The processor may be coupled to the networking device at the edge node of the network. During regulation an appropriate peak information rate for the data traffic associated with the client device may be selected based on the extent of violation.

The peak information rate represents a maximum allowable rate of admission of the data traffic into the network. Further, the selected peak information rate may be assigned for the data traffic associated with the client device to regulate the volume of the data traffic injected into the network through the edge node. In addition, one or more frames exceeding the selected peak information rat may be discarded. Also, the selected peak information rate may be assigned to the client device based on a user class, the user class being indicative of a bandwidth profile of the network chosen by a user of the client device to utilize the network. Furthermore, a number of tokens allowable for the client device, for the predetermined type of data traffic of the predetermined level of compliance relative to the committed bandwidth profile, may be determined through the processor, based on the assigned peak information rate. Each token may represent an authorization to transmit one or more of a predetermined amount and a predetermined size of frames of data traffic through the network.

The determined number of tokens may be allotted to the client device. The tokens may include a first set of tokens and a second set of tokens. The first set of tokens represents a low loss probability for the frames of the data traffic and the second set of tokens represent a high loss probability for the frames of the data traffic associated therewith. Furthermore, an order of precedence of routing a frame associated with the data traffic into the network through the edge node, may be determined based on the allotted number of one or more of the first set of tokens and the second set of tokens.

In another aspect, a computer readable medium including computer-executable instructions which, when performed by a processor operatively coupled to a networking device in a network, cause the processor to quantify an extent of violation of a transmission rate of a data traffic relative to a committed bandwidth profile in a network. The data traffic is generated through a client device coupled to the network. The committed bandwidth profile specifies an average rate of committed and excess data traffic generated by the client device. Also the computer-executable instructions when performed by the processor cause the processor to regulate a volume of the data traffic associated with a particular level of compliance relative to the committed bandwidth profile of the network, routed at an edge node of the network, based on the quantification.

In yet another aspect, a networking device includes a processor configured to regulate a data traffic based on an extent of violation of a transmission rate of the data traffic. The processor includes a traffic classification module configured to classify a data traffic associated with the client device in the network into a number of types based on an extent of violation of a transmission rate of the data traffic relative to a committed bandwidth profile. The processor also includes a marking module to determine an order of precedence of routing a frame associated with the data traffic into the network through an edge node, based on the extent of violation. The marking module may also be configured to classify the frames into a number of types based on the precedence of routing the frames associated with the data traffic into the network through an edge node, based on the extent of violation.

The processor also includes a policing module adapted to quantify an extent of violation of a transmission rate of data traffic relative to a committed bandwidth profile in a network. The data traffic may be generated through a client device coupled to the network. The committed bandwidth profile specifies an average rate of committed and excess data traffic generated by the client device and to regulate a volume of the data traffic associated with a particular level of compliance relative to the committed bandwidth profile of the network, routed at an edge node of the network, based on the quantification.

The particular level of compliance is characterized by the transmission rate exceeding a committed information rate and within a peak information rate. The committed information rate is an average rate of admission of a number of frames associated with the data traffic into the network. The peak information rate represents a maximum allowable rate of admission of the frames into the network. The policing module may further be configured to measure a predetermined type of data traffic injected into the network by the user, during a configurable period of time. The predetermined type of data traffic is of a predetermined level of compliance relative to the committed bandwidth profile of the network. The policing module may further be configured to determine the extent of violation of the transmission rate of the measured predetermined type of data traffic from the committed information rate based on a violation metric.

The policing module may further be configured to select an appropriate peak information rate for the data traffic associated with the client device based on the extent of violation, the peak information rate representing a maximum allowable rate of admission of the data traffic into the network. The policing module may also be configured to assign the selected peak information rate for the data traffic associated with the client device to regulate the volume of the data traffic injected into the network through the edge node. In addition policing module may further be configured to assign the peak information rate to the client device based on a user class, the user class being indicative of a bandwidth profile of the network chosen by a user of the client device to utilize the network. The networking device may constitute an edge node of the network.

The methods, systems, and apparatuses disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus and/or system of regulation of yellow traffic in a network. Although the present embodiments have been described with reference to specific example embodiments, it will be evident that various modifications and changes may be made to these embodiments without departing from the broader spirit and scope of the various embodiments.

Figure 1:
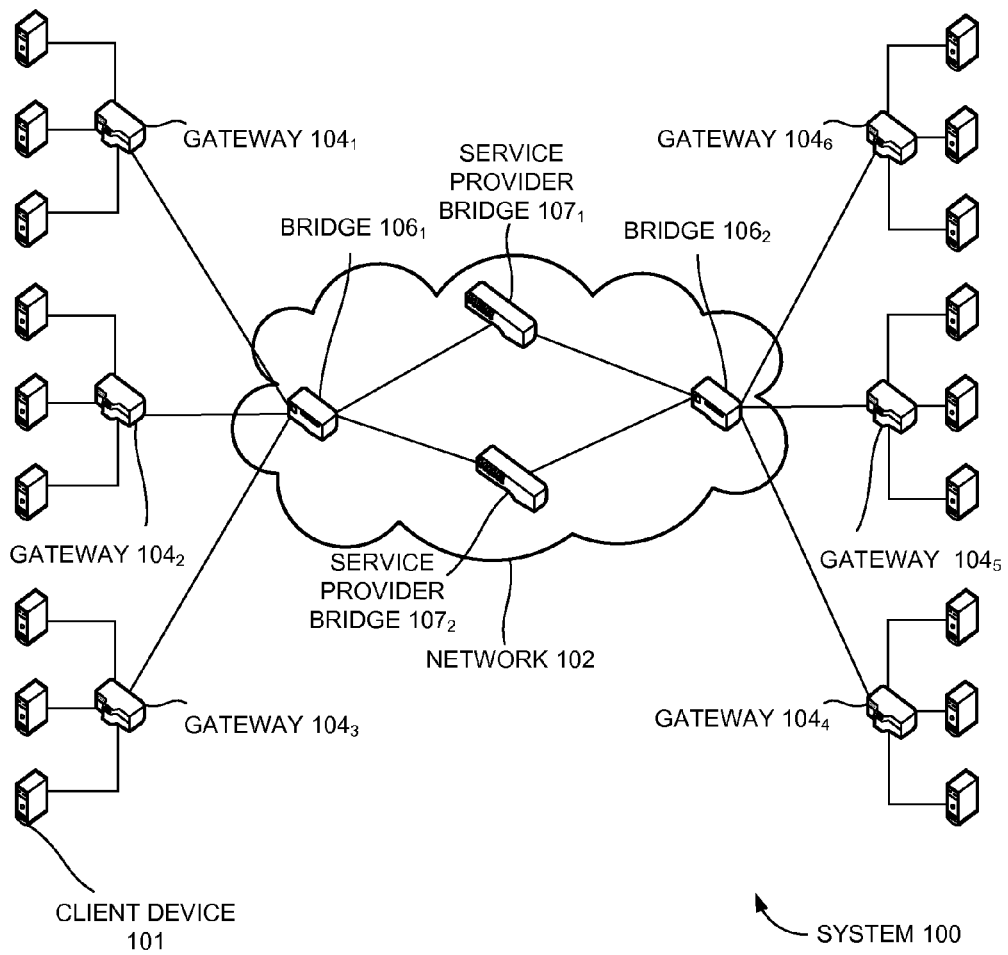
FIG. 1 illustrates a system of regulation of yellow traffic in a network, in accordance with one or more embodiments.

FIG. 1 illustrates a system 100 of regulation of yellow traffic in a network 102, in accordance with one or more embodiments. A data traffic policing may be implemented in the network 102. One or more frames associated with a data traffic entering the network 102 may be classified and/or marked as yellow traffic, red traffic or green traffic to label the frames with different drop probabilities, through the data traffic policing. The green traffic may have a low drop probability when compared to the yellow traffic and the yellow traffic may have a low drop probability when compared to red traffic. In one or more embodiments, the system 100 disclosed herein allows setting of different levels of peak information rate for different users and/or client devices (e.g., desktops. laptops, and the like) connected to one or more networking devices forming edge nodes of the network 102, based on quantification of an extent of violation of a transmission rate of data traffic generated by the client devices (e.g., client device 101), relative to a committed bandwidth profile. Example of the networking device may include, but is not limited to, a router, a bridge, a switch and the like. The committed bandwidth profile may specify an average rate of committed and excess data traffic generated by a client device from among the client devices coupled to the network 102.

In one or more embodiments, the system 100 may also allow regulation of a volume of the data traffic associated with a particular level of compliance relative to the committed bandwidth profile of the network 102 (e.g. yellow traffic entering the network 102) at one or more edge nodes of the network 102, based on the quantification. One or more networking devices (e.g., bridge $106_1$-$106_2$) in the network 102, may be operatively coupled to a processor configured to regulate the volume of the data traffic (e.g. yellow traffic entering the network 102) at one or more edge nodes of the network 102 based on the quantification. The networking devices may constitute one or more edge nodes of the network 102. In one or more embodiments, the particular level of compliance may be characterized by the transmission rate exceeding a committed information rate and not exceeding a peak information rate (e.g. yellow traffic).

The committed information rate (CIR) may be an average rate of admission of a number of frames associated with the data traffic into the network 102. The peak information rate may be a maximum allowable rate of admission of the frames into the network 102. The volume of the yellow traffic corresponding to each level of the peak information rate may be different and also the volume of yellow traffic may decrease with an increase in the level peak information rate. The client devices may be communicatively coupled to one or more networking devices (e.g., edge bridge $106_1$ and $106_2$, and service provider bridge $107_1$ and $107_2$)) through one or more gateway devices (e.g., gateway $104_1$-$104_6$) in the network 102. In one or more embodiments, one or more of the networking devices may be coupled to one or more gateway devices. For example, as illustrated in FIG. 1, the edge bridge $106_1$ may be coupled to gateway $104_1$, $104_2$, and $104_3$ and similarly the edge bridge $106_2$ may be coupled to gateway $104_4$, $104_5$, and $104_6$.

In one or more embodiments, the processor may include a traffic classification module configured to classify the data traffic associated with the client devices in the network 102 into a number of types based on the extent of violation of the transmission rate of the data traffic relative to the committed bandwidth profile. In one or more embodiments, the processor may also include a marking module to determine an order of precedence of routing a frame associated with the data traffic into the network 102 through an edge node, based on the extent of violation. In one or more embodiments the processor may further include a policing module adapted to quantify an extent of violation of a transmission rate of a data traffic relative to a committed bandwidth profile in the network 102, In one or more embodiments, the policing module may be configured to regulate a volume of the data traffic associated with a particular level of compliance relative to the committed bandwidth profile of the network 102, routed at an edge node of the network 102, based on the quantification.

The committed bandwidth profile may be characterized by one or more of the committed information rate, a peak information rate, a committed burst size, and a peak burst size. The committed burst size may represent a maximum size of the frames transmittable through the network 102. The peak burst size may represent a maximum size of uncommitted frames that the network 102 attempts to carry. In one or more embodiments, the policing module may further be configured to measure a predetermined type of data traffic injected into the network 102 by the user, during a configurable period of time. The predetermined type of data traffic is of a predetermined level of compliance relative to the committed bandwidth profile of the network 102. The policing module may further be configured to determine the extent of violation of the transmission rate of the measured predetermined type of data traffic from the committed information rate based on a violation metric.

The policing module may further be configured to select an appropriate peak information rate for the data traffic associated with the client device based on the extent of violation. The peak information rate may represent a maximum allowable rate of admission of the data traffic into the network 102. The policing module may further be configured to assign the selected peak information rate for the data traffic associated with the client device to regulate the volume of the data traffic injected into the network 102 through the edge node. The policing module may furthermore be configured to discard one or more of the frames associated with the data traffic if the frames exceed the selected peak information rate. In one or more embodiments, the policing module may further be configured to assign the peak information rate to the client device based on a user class. The user class may be indicative of a bandwidth profile of the network 102 chosen by a user of the client device to utilize the network 102.

Figure 2A:
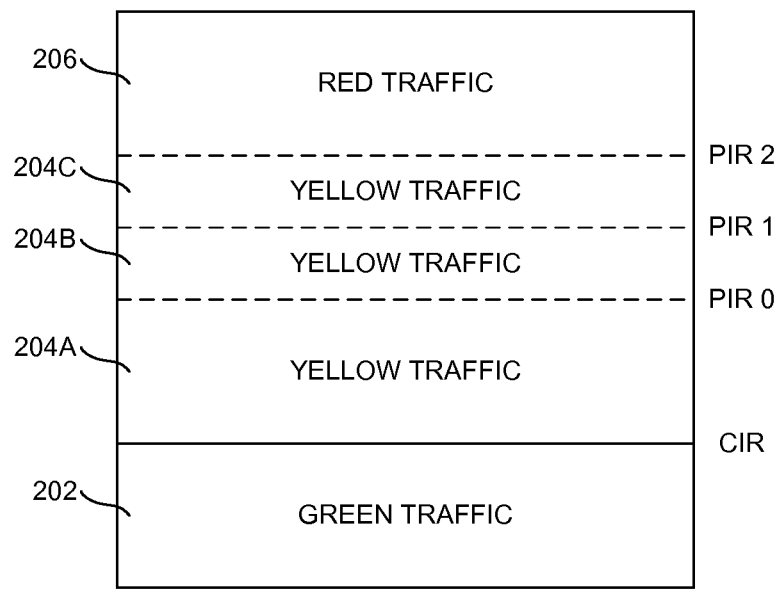
FIGS. 2A-2B illustrate a schematic view of distribution of various types of data traffic of the network relative to various levels of peak information rate, in accordance with one or more embodiments.
Figure 2B:
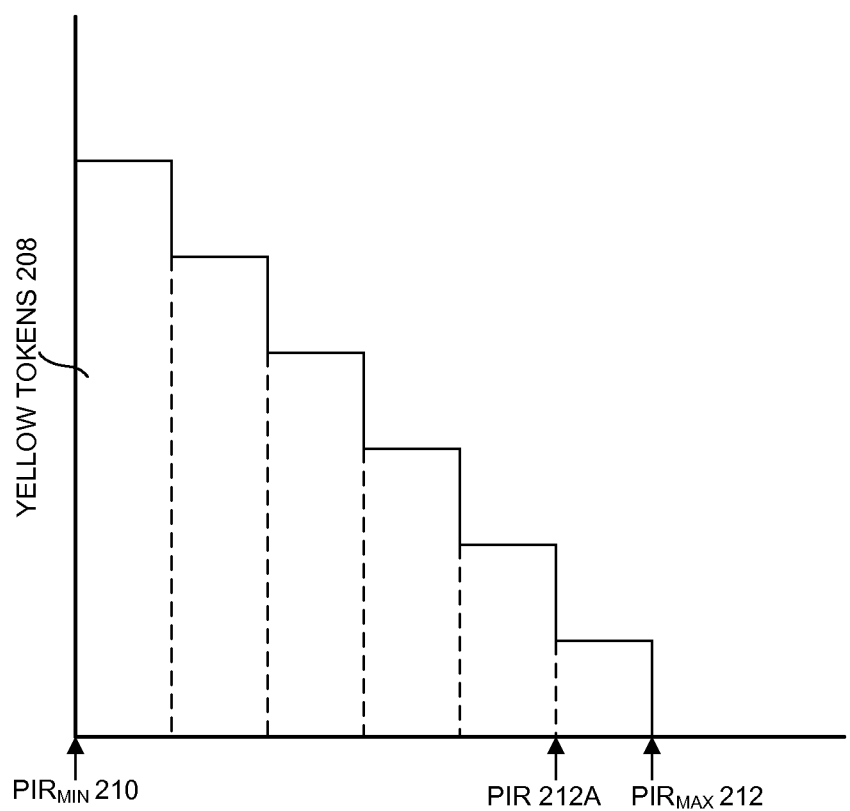

FIGS. 2A-2B illustrates a schematic view of distribution of various types of data traffic of the network 102 relative to various levels of peak information rate, in accordance with one or more embodiments. The data traffic may be classified into various types based on an order of precedence of routing one or more frames associated with the data traffic into the network 102 through one or more edge nodes of the network 102. The order of precedence may determine various drop probabilities to be assigned to various frames associated with the data traffic. Each of the client devices may be assigned a peak information rate based on the extent of violation of transmission rate data traffic of the client devices relative to the committed bandwidth profile. The data traffic with a transmission rate exceeding a maximum peak information rate (PIR2) specified by a service provider, may be classified and/or marked as red traffic 206 as illustrated in FIG. 2A.

The data traffic with transmission rate below the committed information rate (CIR) may be classified and/or marked as green traffic 202. Similarly, data traffic with transmission rate between the CIR and a specific PIR assigned to each of client devices may be classified and/or marked as yellow traffic (e.g., 204A-C). In accordance with one or more embodiments of the system, and/or method disclosed herein, one or more tokens may be allotted to each of the client devices based on the peak information rate (e.g., PIR0 and PIR1) assigned to the client devices. The tokens may represent an authorization to transmit a predetermined amount and/or a predetermined size of frames of data traffic through the network 102. In one or more embodiments, a first set of tokens (e.g. one or more green tokens) and a second set of tokens (e.g. one or more yellow tokens) may be allotted to each of the client devices coupled to the edge nodes of the network 102.

The first set of tokens may represent a low loss probability for the frames of the data traffic (e.g., frames associated with green traffic). The first set of tokens may determine a predetermined amount and/or size of green traffic associated with the client device allowable to be routed through the networking devices at the edge nodes of the network 102 into the core of the network 102. Similarly, the second set of tokens may represent a high loss probability for the frames (e.g., frames associated with yellow traffic) of the data traffic. The second set of traffic may determine a predetermined amount and/or size of yellow traffic (e.g., 204A-204C) associated with the client devices allowable to be routed through the networking devices at the edge nodes into the core of the network 102.

The amount of yellow traffic allowable to be routed through the edge nodes may be different for different levels of the peak information rates assigned to various client devices. In one or more embodiments, the amount of yellow traffic allowable may decrease with the increase in the level of peak information rate level as illustrated in FIG. 2A. The amount of yellow traffic (e.g., 204A) for a level of peak information rate (e.g. PIR0) just above the CIR level may be more than the amount of yellow traffic (e.g. 204B) for a subsequent level of peak information rate (e.g. PIR 1) as illustrated in FIG. 2A. Similarly, the amount of yellow traffic (e.g., 204C) for a level of peak information rate PIR2 may be less than the amount of yellow traffic (e.g. 204B) for the level of peak information rate PIR1. Similarly a number of yellow tokens (e.g., 208) allotted to the client devices may also decrease with the increase in the level of the peak information rate as illustrated in FIG. 2B.

Also, a number of green tokens allotted to the client devices may be determined based on the assigned peak information rate levels. The client devices having a low violation relative to the committed bandwidth profile may be assigned a high level of peak information rate when compared to the client device having a high violation. The client devices with a low violation may be allotted less number of yellow tokens and may be allowed to generate more green traffic and inject into the core of the network 102, when compared to the client devices having high violation. The number of yellow tokens to be allotted to each of the client devices may be determined based the following algorithm.

> Number of tokens $N$=Number of tokens in the previous level+(PIR$_{(maxlevel-inlevel)}$–CIR), inlevel being the incoming data traffic rate in units of peak information rate.

For example consider N levels peak information rate assigned through a networking device in the network 102. The number of yellow tokens in different levels of peak information rate is as illustrated in Table 1.

TABLE 1

| Sl. No | Incoming traffic rate | Number of yellow tokens(Ntokens) |
|---|---|---|
| 1 | PIR0 | Ntokens$_{(previous)}$ + (PIR$_n$ – CIR) |
| 2 | PIR1 | Ntokens$_{(previous)}$ + (PIR$_{n-1}$ – CIR) |
| 3 | PIR2 | Ntokens$_{(previous)}$ + (PIR$_{n-2}$ – CIR) |
| 4 | PIRn | Ntokens$_{(previous)}$ + (PIR$_0$ – CIR) |

Figure 3:
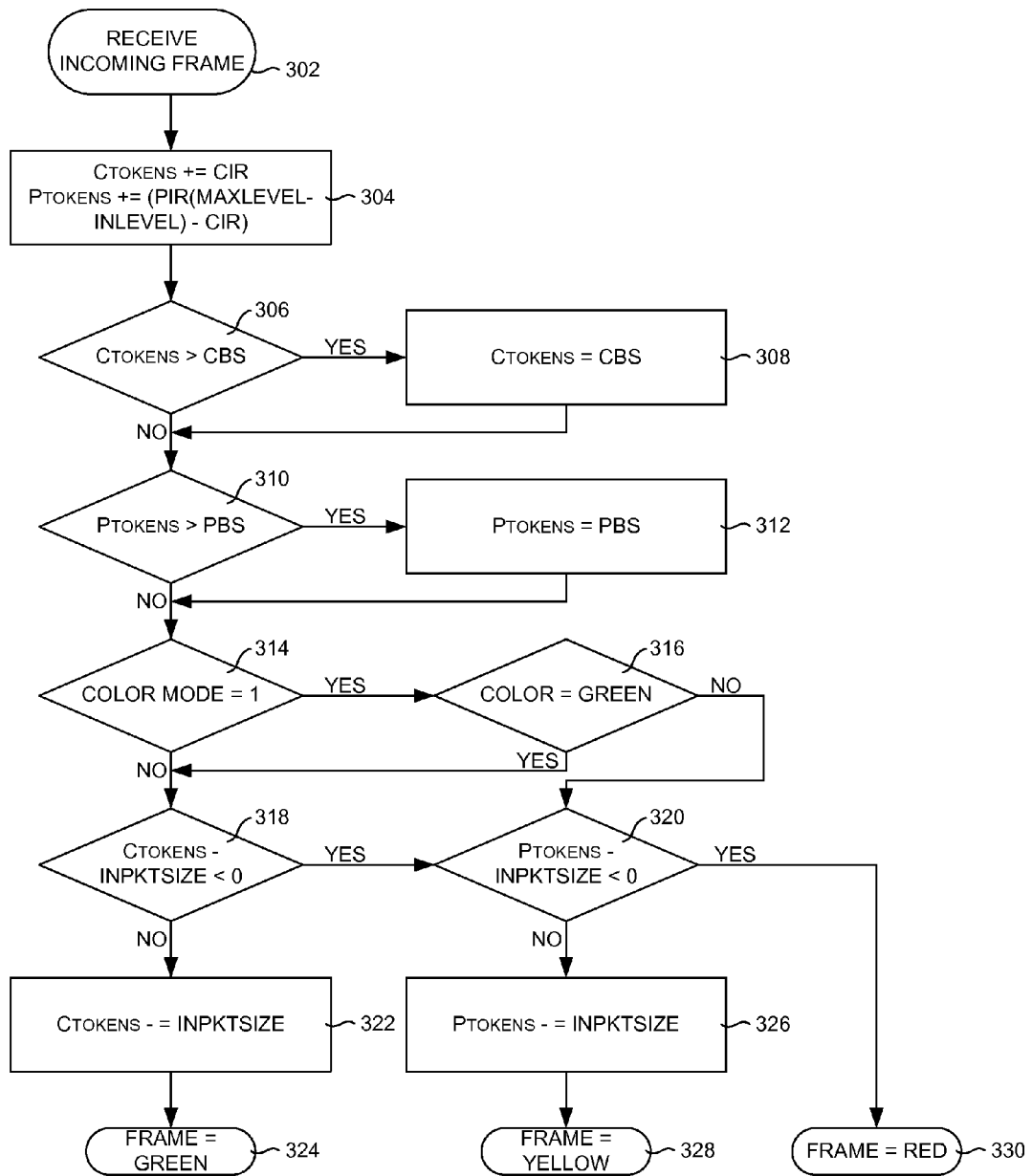
FIG. 3 is a flow chart illustrating an enhanced two rate three color marking algorithm, in accordance with one or more embodiments.

FIG. 3 is a flow chart illustrating an enhanced two rate three color marking algorithm, implemented through the system 100 of FIG. 1, in accordance with one or more embodiments. In one or more embodiments, at step 302, an incoming data frame is received. At step 304, a number of yellow tokens (Ptokens) and a number of green tokens (Ctokens) is determined for the incoming data frame. The number of green tokens and the number of yellow tokens is given by equations (1) and (2) respectively.

$$C \text{ tokens+=committed information rate.} \quad (1)$$

$$P\text{tokens+=}P\text{tokens}_{(maxlevel\text{-}Inlevel)}\text{–CIR,} \quad (2)$$

inlevel being the incoming data traffic rate in units of peak information rate.

In one or more embodiments, at step 306, it is checked if Ctokens exceeds the committed burst size. If the Ctokens exceeds the committed burst size, then at step 308, the Ctokens is set to the committed burst size (CBS). Alternatively, if Ctokens does not exceed CBS, then at step 310, it is checked if Ptokens exceeds the peak burst size (PBS). If Ptokens exceeds PBS, then at step 312, Ptokens is brought down to PBS and set to PBS. Alternatively, if PTokens does not exceed PBS, then at step 314, it is checked if the color mode field in the incoming data frame is set to 1. If the color mode is set to 1, then at step 316, it is checked if the incoming data frame is marked as green. If the incoming data frame is marked as green then at step 318, it is checked if the size of the incoming data frame (INPKTSIZE) exceeds the Ctokens. If the INPKTSIZE does not exceed Ctokens then at step 322, the Ctokens amount of incoming data frames are obtained and at step 324, the obtained data frame are marked as green. Alternatively, if at step 318, the Ctokens exceeds INPKTSIZE, then at step 320, it is checked if INPKTSIZE exceeds Ptoken. If INPKTSIZE exceeds Ptoken, then at step 330 the incoming data frame is marked as red. Else, if INPKTSIZE does not exceed Ptoken, then Ptoken amount of incoming data frames are obtained at step 326 and at step 328, the Ptoken amount of data frames are marked as yellow.

Figure 4:
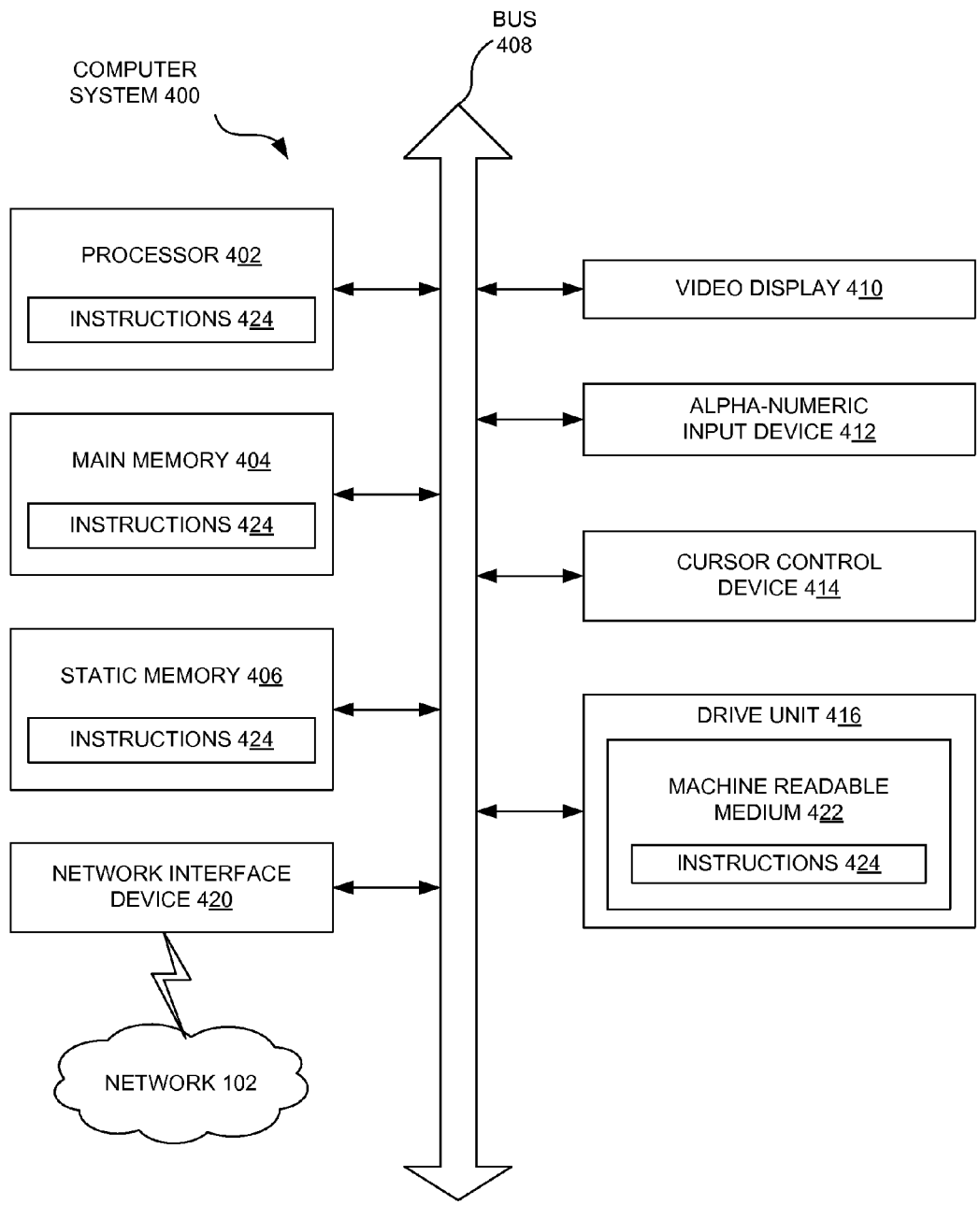
FIG. 4 shows a diagrammatic representation of client device of FIG. 1, in accordance with one or more embodiments.

FIG. 4 shows a diagrammatic representation of client device 101 of FIG. 1 in the example form of a computer system 400 within which a set of instructions, for causing the client device 101 to perform any one or more of the methodologies discussed herein, may be executed. In various embodiments, the client device 101 operates as a standalone device and/or may be connected (e.g., networked) to other machines. In a networked deployment, the client device 101 may operate in the capacity of a server and/or a client machine in server-client network environment, and/or as a peer machine in a peer-to-peer (or distributed) network environment. The client device 101 may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by the client device 101. Further, while only a single client device 101 is illustrated, the term "client device" shall also be taken to include any collection of client devices that individually and/or jointly execute a set (or multiple sets) of instructions to perform any one and/or more of the methodologies discussed herein.

The example computer system 400 includes a processor 402 (e.g., a central processing unit (CPU) a graphics processing unit (GPU) and/or both), a main memory 404 and a static memory 406, which communicate with each other via a bus 408. The computer system 400 may further include a video display unit 410 (e.g., liquid crystals display (LCD) and/or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420. The disk drive unit 416 includes a machine-readable medium 422 on which is stored one or more sets of instructions (e.g., software 424) embodying any one or more of the methodologies and/or functions described herein. The software 424 may also reside, completely and/or at least partially, within the main memory 404 and/or within the processor 402 during execution thereof by the computer system 400, the main memory 404 and the processor 402 also constituting machine-readable media. The software 424 may further be transmitted and/or received over a network 102 via the network interface device 420.

While the machine-readable medium 422 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the client device 101 and that cause the client device 101 to perform any one or more of the methodologies of the various embodiments. The term "machine-readable medium" shall accordingly be taken to include, but not be limited to, solid-state memories, optical and magnetic media, and carrier wave signals.

Figure 5:
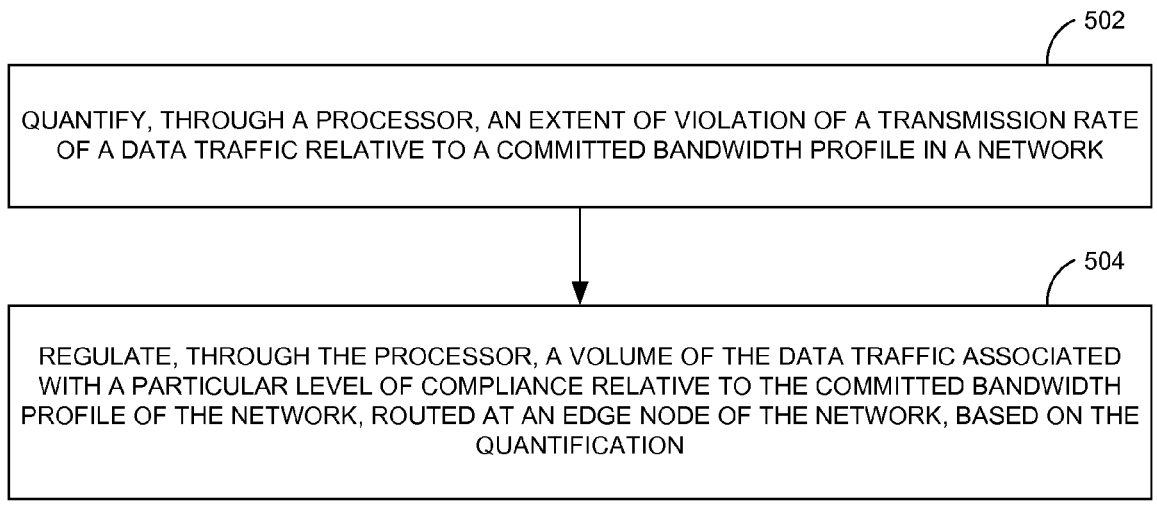
FIG. 5 is a process flow illustrating a method of regulating yellow traffic in a network, in accordance with one or more embodiments.

FIG. 5 is a process flow illustrating a method of regulating yellow traffic in a network, in accordance with one or more embodiments. In one or more embodiments, in operation 502, an extent of violation of a transmission rate of a data traffic relative to a committed bandwidth profile in a network may be quantified, through a processor. The processor may be coupled to a networking device at an edge node of the network. The data traffic may be generated through a client device coupled to the network. The committed bandwidth profile may specify an average rate of committed and/or excess data traffic generated by the client device.

During quantifying, a predetermined type of data traffic injected into the network through the client device may be measured during a configurable period of time (∂t). The predetermined type of data traffic may be associated with a predetermined level of compliance relative to the committed bandwidth profile of the network. The predetermined type of data traffic may be associated with a particular range of drop probability. The predetermined type of data traffic may be for example, yellow traffic. In one or more embodiments, the extent of violation of the transmission rate of the measured predetermined type of data traffic from the committed bandwidth profile may be determined based on a violation metric. In one or more embodiments, the violation metric may include an excess traffic indication factor E(∂t), given by equation (3).

$$E(\partial t)=(1-k)E(\partial t-1)+k*((N_y+N_r)/N_t), \quad (3)$$

k may be a configurable moving average factor and the range of k may include 0<k<=1. The $N_y$ and $N_r$ may be number of yellow data frames and red data frames respectively generated during the configurable period of time (∂t). The excess indication factor may be normalized. The normalization (inlevel) of the excess indication factor is given by equation (4).

$$\text{Inlevel}=E(\partial t)*PIR_{max} \quad (4)$$

$PIR_{max}$ is the maximum PIR level beyond which all data frames are marked as red.

Consider for example, if 1000 frames are generated by a client device, and out of the 1000 frames, 500 frames are marked as yellow ($N_y$=500) and 200 frames are marked as red ($N_r$=200). If k is 1, then the excess traffic indication factor E(∂t) is 0.7 based on equation (3). If the maximum peak information rate is 10 Mbps, then Inlevel would be 7 based on equation (4). In one or more embodiments, in operation 504, a volume of the data traffic associated with a particular level of compliance relative to the committed bandwidth profile of the network, routed at an edge node of the network, may be regulated based on the quantification. The particular level of compliance may be characterized by the transmission rate exceeding a committed information rate and lying within a peak information rate. The committed information rate may be an average rate of admission of a number of frames associated with the data traffic into the network. The peak information rate may represent a maximum allowable rate of admission of the frames into the network. The committed bandwidth profile may be characterized by one or more of a committed information rate, a peak information rate, a committed burst size, and a peak burst size.

The committed information rate may be an average rate of admission of a number of frames associated with the data traffic into the network. The peak information rate may represent a maximum allowable rate of admission of the frames into the network. The committed burst size may represent a maximum size of frames, transmittable through the network. The peak burst size may represent a maximum size of an uncommitted frame of the data traffic that the network attempts to carry. In one or more embodiments, an appropriate peak information rate may be selected for the data traffic associated with the client device based on the extent of violation. Further, in one or more embodiments, the selected peak information rate may be assigned for the data traffic associated with the client device to regulate the volume of the data traffic injected into the network through the edge node. In addition, one or more frames exceeding the selected peak information rate may be discarded.

The frame may be associated with the data traffic generated by the client device. In one or more embodiments, the selected peak information rate may be assigned to the client device based on a user class. The user class may be indicative of a bandwidth profile of the network chosen by a user of the client device to utilize the network. After assigning the peak information rate, in one or more embodiments, a number of tokens allowable for the client device, for the predetermined type of data traffic of the predetermined level of compliance relative to the committed bandwidth profile, may be determined based on the assigned peak information rate. Each token may represent an authorization to transmit one or more of a predetermined amount and a predetermined size of frames of data traffic through the network. Further, the determined number of tokens may be allotted to the client device. The tokens may include a first set of tokens and a second set of tokens. The first set of tokens (e.g., green tokens) represents a low loss probability for the frames of the data traffic and a second set of tokens (yellow tokens) represent a high loss probability for the frames of the data traffic associated therewith.

In one or more embodiments, an order of precedence of routing a frame associated with the data traffic into the network through the edge node may be determined based on the allotted number of the first set of tokens and/or the second set of tokens. For example, if more number of green tokens are allotted, then a number of frames may be marked green in accordance with the number of green tokens allotted and the green frames may be routed with low loss probability. Similarly, a number of frames may be marked yellow based on the number of yellow tokens allotted thereby controlling the volume of yellow traffic injected into the core of the network through the edge nodes based on the extent of violation relative to the committed bandwidth profile. Higher the peak information rate assigned to the client device, lower would be the number of yellow tokens allotted to the client device.

Although the present embodiments have been described with reference to specific example embodiments, it will be evident that various modifications and changes may be made to these embodiments without departing from the broader spirit and scope of the various embodiments. For example, the various devices (e.g. processor, networking devices), modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

What is claimed is:

1. A method comprising:
    quantifying an extent of a violation of a transmission rate of data traffic generated by a given client device over a predefined period of time relative to a committed bandwidth profile in a network, wherein the committed bandwidth profile specifies an average rate of committed data traffic and excess data traffic generated by the client device; and
    regulating a volume of data traffic associated with the given client device, which can be injected into a core of the network through edge nodes thereof, based on the quantified extent of said violation by the given client device, wherein regulating the volume of data traffic comprises:
        selecting a peak information rate for the data traffic associated with the given client device based on the quantified extent of said violation by the given client device, wherein the selected peak information rate is less than a predefined maximum peak information rate for the network;

regulating a volume of green and yellow traffic of the data traffic associated with the given client device which is injected into the core of the network through edge nodes thereof based on the selected peak information rate; and discarding as red traffic, the data traffic associated with the given client device which exceeds the selected peak information rate, wherein the quantifying and regulating steps are implemented by one or more processors.

2. The method of claim 1, wherein the selected peak information rate is based on the transmission rate exceeding a committed information rate and lying within one of a plurality of different levels of peak information rate which are less than the predefined maximum peak information rate for the network, wherein the committed information rate is an average rate of admission of a plurality of frames associated with the data traffic into the network, and wherein the predefined maximum peak information rate for the network represents a maximum allowable rate of admission of the frames into the network.

3. The method of claim 1, wherein the one or more processors are coupled to a networking device constituting an edge node of the network.

4. The method of claim 1, wherein the committed bandwidth profile further specifies at least one of a committed information rate, the maximum peak information rate, a committed burst size, and a peak burst size, wherein the committed information rate is an average rate of admission of a plurality of frames associated with the data traffic into the network, wherein the maximum peak information rate represents a maximum allowable rate of admission of the frames into the network, wherein the committed burst size represents a maximum size of frames transmittable through the network, and wherein the peak burst size represents a maximum size of an uncommitted frame of the data traffic that the network attempts to carry.

5. The method of claim 1, wherein quantifying the extent of the violation of the transmission rate of data traffic generated by the given client device over the predefined period of time comprises:

determining a total amount of data traffic generated by the given client device over the predefined period of time;

determining an amount of yellow and red traffic of said total amount of data traffic generated by the given client device over the predefined period of time; and computing the extent of the violation of the transmission rate of the data traffic generated by the given client device over the predefined period of time using a violation metric, wherein the violation metric is based, in part, on a ratio of said determined amount of the yellow and the red traffic to said total amount of data traffic generated by the given client device over the predefined period of time.

6. The method of claim 5, wherein selecting the peak information rate for the data traffic associated with the given client device based on the quantified extent of said violation by the given client device comprises:

determining a level of peak information rate by multiplying the computed extent of said violation by the predefined maximum peak information rate for the network; and assigning the selected peak information for the data traffic associated with the given client device based on the determined level of peak information rate.

7. The method of claim 1, further comprising:

assigning the selected peak information rate to the client device based on a user class, wherein the user class is indicative of a bandwidth profile of the network associated with a user of the client device.

8. The method of claim 1, further comprising:

determining a number of tokens allowable for the given client device, based on the selected peak information rate, wherein each token represents an authorization to transmit at least one of a predetermined amount and a predetermined size of frames of data traffic through the network; and allotting a determined number of tokens to the given client device, wherein the tokens comprise a first set of tokens and a second set of tokens, and wherein the first set of tokens are associated with the green data traffic and the second set of tokens are associated with the yellow data traffic.

9. The method of claim 8, further comprising:

determining an order of precedence of routing a frame associated with the data traffic into the network through the edge node based on an allotted number of at least one of the first set of tokens and the second set of tokens.

10. The method of claim 1, wherein an amount of allowable yellow traffic associated with a client device decreases with an increase in a level of the peak information rate selected for the client device.

11. A non-transitory computer readable medium comprising processor-executable instructions embodied therein which, when executed by a processor, causes the processor to implement a process comprising:

quantifying an extent of a violation of a transmission rate of data traffic generated by a given client device over a predefined period of time relative to a committed bandwidth profile in a network, wherein the committed bandwidth profile specifies an average rate of committed data traffic and excess data traffic generated by the client device; and regulating a volume of data traffic associated with the given client device, which can be injected into a core of the network through edge nodes thereof, based on the quantified extent of said violation by the given client device, wherein regulating the volume of data traffic comprises:

selecting a peak information rate for the data traffic associated with the given client device based on the quantified extent of said violation by the given client device, wherein the selected peak information rate is less than a predefined maximum peak information rate for the network;

regulating a volume of green and yellow traffic of the data traffic associated with the given client device which is injected into the core of the network through edge nodes thereof based on the selected peak information rate; and discarding as red traffic, the data traffic associated with the given client device which exceeds the selected peak information rate.

12. A networking device comprising:

a memory configured to store processor-executable instructions; and a processor communicatively coupled to the memory, wherein the processor is configured to execute the processor-executable instructions to implement a process comprising:

quantifying an extent of a violation of a transmission rate of data traffic generated by a given client device over a predefined period of time relative to a committed bandwidth profile in a network, wherein the committed bandwidth profile specifies an average rate of committed data traffic and excess data traffic generated by the client device; and regulating a volume of data traffic associated with the given client device, which can be injected into a core of the network through edge nodes thereof, based on the quantified extent of said violation by the given client device, wherein regulating the volume of data traffic comprises:

selecting a peak information rate for the data traffic associated with the given client device based on the quantified extent of said violation by the given client device, wherein the selected peak information rate is less than a predefined maximum peak information rate for the network;

regulating a volume of green and yellow traffic of the data traffic associated with the given client device which is injected into the core of the network through edge nodes thereof based on the selected peak information rate; and discarding as red traffic, the data traffic associated with the given client device which exceeds the selected peak information rate.

13. The networking device of claim 12, wherein the selected peak information rate is based on the transmission rate exceeding a committed information rate and lying within one of a plurality of different levels of peak information rate which are less than the predefined maximum peak information rate for the network, wherein the committed information rate is an average rate of admission of a plurality of frames associated with the data traffic into the network, and wherein the predefined maximum peak information rate for the network represents a maximum allowable rate of admission of the frames into the network.

14. The networking device of claim 13, wherein the process implemented by the processor further comprises classifying the plurality of frames into a plurality of types according to a precedence of routing the frames associated with the data traffic into the network through an edge node, based on the quantified extent of said violation by the given client device.

15. The networking device of claim 12, wherein the committed bandwidth profile further specifies at least one of a committed information rate, the maximum peak information rate, a committed burst size, and a peak burst size, wherein the committed information rate is an average rate of admission of a plurality of frames associated with the data traffic into the network, wherein the maximum peak information rate represents a maximum allowable rate of admission of the frames into the network, wherein the committed burst size represents a maximum size of frames transmittable through the network, and wherein the peak burst size represents a maximum size of an uncommitted frame of the data traffic that the network attempts to carry.

16. The networking device of claim 12, wherein quantifying the extent of the violation of the transmission rate of data traffic generated by the given client device over the predefined period of time comprises:

determining a total amount of data traffic generated by the given client device over the predefined period of time;

determining an amount of yellow and red traffic of said total amount of data traffic generated by the given client device over the predefined period of time; and computing the extent of the violation of the transmission rate of the data traffic generated by the given client device over the predefined period of time using a violation metric, wherein the violation metric is based, in part, on a ratio of said determined amount of the yellow and the red traffic to said total amount of data traffic generated by the given client device over the predefined period of time.

17. The networking device of claim 16, wherein selecting the peak information rate for the data traffic associated with the given client device based on the quantified extent of said violation by the given client device comprises:

determining a level of peak information rate by multiplying the computed extent of said violation by the predefined maximum peak information rate for the network; and assigning the selected peak information for the data traffic associated with the given client device based on the determined level of peak information rate.

18. The networking device of claim 12, wherein the process implemented by the processor further comprises assigning the selected peak information rate to the client device based on a user class, wherein the user class is indicative of a bandwidth profile of the network associated with a user of the client device.

19. The networking device of claim 12, constituting the edge node of the network.

20. The networking device of claim 12, wherein an amount of allowable yellow traffic associated with a client device decreases with an increase in a level of the peak information rate selected for the client device.

* * * * *